Feb. 14, 1956 J. GOLDBERG ET AL 2,735,082
DATA SORTING SYSTEM
Filed March 29, 1954
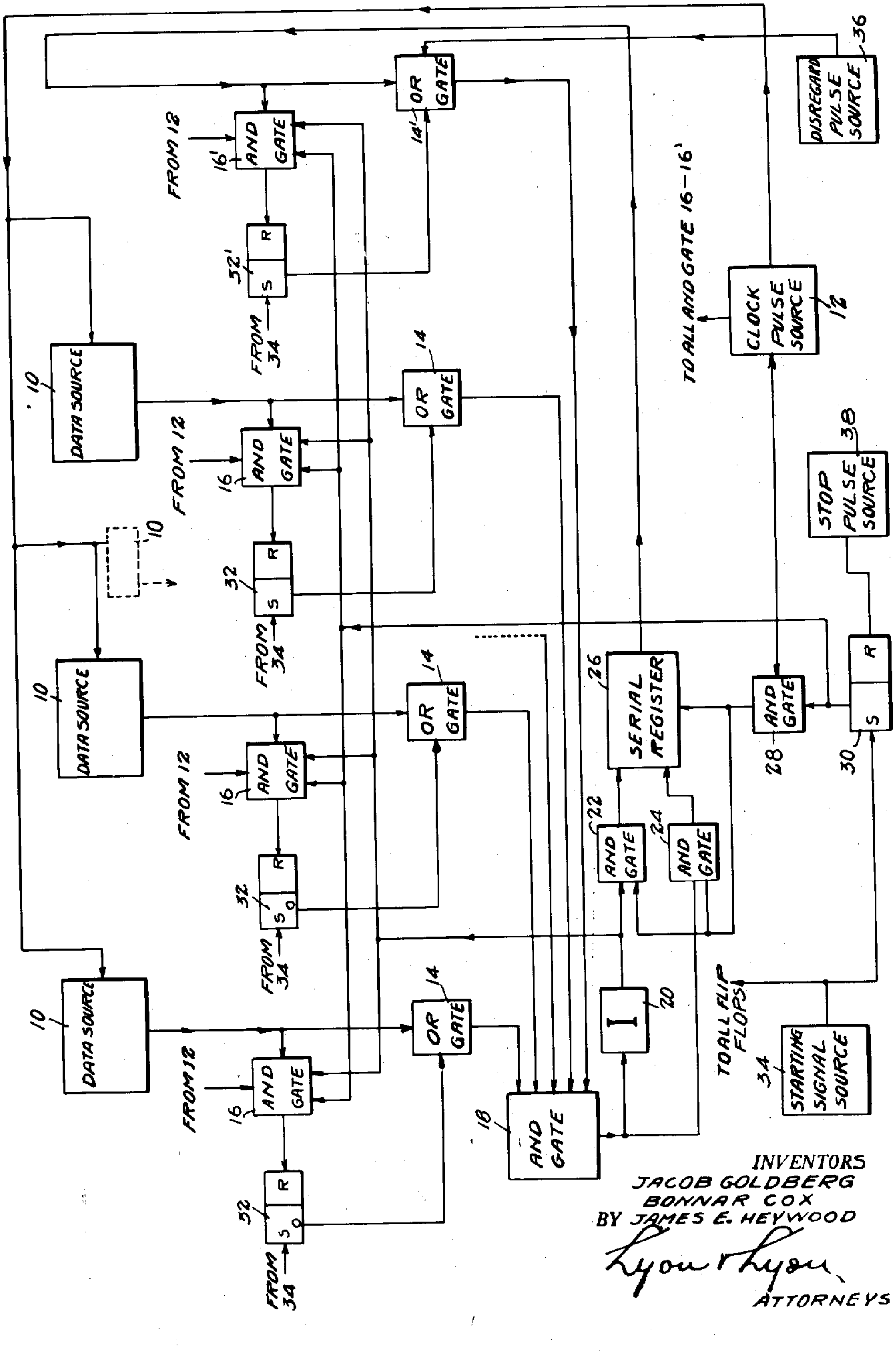
INVENTORS
JACOB GOLDBERG
BONNAR COX
BY JAMES E. HEYWOOD
Lyon & Lyon
ATTORNEYS United States Patent Office 2,735,082

Patented Feb. 14, 1956

2,735,082

DATA SORTING SYSTEM

Jacob Goldberg, Bonnar Cox, and James E. Heywood, Palo Alto, Calif.

Application March 29, 1954, Serial No. 419,224

9 Claims. (Cl. 340—147)

This invention relates to a system for electronically sorting data, and, more particularly, to a system for sorting information provided in random fashion from a plurality of sources.

Electronic information handling machines which are in operation today or which are being constructed usually have a large amount of data supplied to them. The machine usually performs a few simple operations on or with this data and then a large amount of output information is provided by the machine. This type of operation may be contrasted with the scientific type of computer where a small amount of information is provided, the computer performs a great number of operations therewith, and then provides a small amount of information as its output. Data may be provided to an information handling machine in random order, and the data may be ordered by the machine by using some identifying number accompanying the data or the data code itself. Furthermore, in the data handling process the data may be disarranged and may be required to be arranged in order again before a next operation or before being printed out. The data on which the machines operate at present is usually in a coded form, and the codes presently finding great favor are the various types of binary codes. A coding process usually transforms the input data into binary coded numbers.

A feature of the present invention is the provision of apparatus that can receive binary coded numbers from a plurality of sources and can select the highest binary number or the lowest, as desired, from the data being provided from the plurality of sources.

Another feature of the present invention is to provide apparatus which can take binary coded information which is randomly arranged and to arrange it in a desired sequence.

Still another object of this invention is the provision of a novel, useful, and simple sorting apparatus and system.

These and further objects of this invention are achieved in a system wherein a plurality of data sources provide signals representative of binary coded numbers which are ordered serially and with the most significant digit first. All these data sources are coupled to an AND gate which has an inverter connected to its output. As the binary coded numbers are applied from the data sources to the AND gate digit by digit, the AND gate provides an output, when the digits are all the same and of one type (for example, "1"), and no output when the digits are not all the same or of another type (for example, all "0's" or "1's" and "0's"). The inverter will provide an output in the absence of an output from the AND gate and will not provide an output in the presence of an output from the AND gate.

A plurality of means are provided, each of which has an input coupled to a different data source, another input coupled to the inverter output, and its output coupled to the same input to the AND gate as that from the data source to which the input of the means is coupled. Whenever there is an output from the inverter and the data source provides a digit of said "1" type, these means will operate to provide an output in place of the digit from the data source which is of said "1" type. This output is maintained during the remainder of the comparing process. Thus the digits from the data source are effectively closed or prevented from being applied to the AND gate. In this manner, digits are obtained from the data sources which are stored in a register coupled to the output of the AND gate. The register, of course, stores sequentially either a digit of said "1" type or of the "0" type, depending upon the output of the AND gate. Thus the lowest binary number is stored in the register. By making the AND gate and the plurality of means responsive to "0's" and to provide a "0" output to the AND gate, the highest binary number can be selected, since the data sources having the lowest numbers are successively cut off in this manner.

The novel features that are considered characteristic of this invention are set forth with particularity in the appended claims. The invention, itself, both as to its organization and method of operation, as well as additional objects and advantages thereof, will best be understood from the following description when read in connection with the accompanying drawing, which is a schematic diagram of the embodiment of the invention.

The information handling machines used at present usually store binary coded data on magnetic tape or magnetic drums, and, in a few instances, photographic storage of binary coded data is used. Such data may be stored in parallel fashion, that is, a binary number consisting of, for example, six binary digits is stored transversely on tape and is followed by other six binary digit numbers similarly stored. The transverse storage space for the six digits is usually referred to as a "slot," each binary digit being stored in a cell in that slot. Each of these cells usually is aligned with the cell in the preceding slot, and the aligned cells are referred to as tracks. This type of storage is also used with magnetic drums.

Another manner of number storage is to store binary digits serially longitudinally; that is, six binary digits are stored, one digit in each cell, but the cells occupied by a given number extend longitudinally along the tape and are contained in a track.

The embodiment of this invention, which is described herein, is described in connection with data being supplied serially from a plurality of data sources. Each of these sources may be a plurality of tracks with data stored serially therein as briefly described above. However, in the case of parallel data storage on a magnetic medium, the data can be readily read from the tape or drum into a register, from whence it may be stepped out to be serial. Accordingly, although the invention is described in connection with the serial type of data source, it is to be understood that this is not to be construed as a limitation on the invention, since it is well within the skill of one versed in the art to convert data from parallel form to serial form, or vice versa.

Referring now to the drawing, a plurality of data sources 10 are represented by rectangles. These data sources may be of the type described above which supply data in serial fashion, binary digit by binary digit, with the most significant digit for each number coming first. The numbers to be compared are all of the same length, for example, seven digits. If a number is shorter than seven digits, then it is brought up to seven digits by using "0's" in the vacant places (i. e., 0010110, 1100101, 0000001). Let it be assumed further that a "1" in the binary code is represented by a signal more positive than a preassigned level and a "0" is represented by the absence of a "1," or, in effect, the presence of a signal which is less positive than a preassigned level. Furthermore, the digits are provided by the plurality of data sources substantially simultaneously, and this is secured by means of clock pulses or timing pulses in a manner well known in the computing art. Accordingly, binary digits are provided substantially simultaneously by each of the data sources, which are timed by pulses from a clock-pulse source 12.

Each of the data sources 10 is connected to (1) a separate OR gate 14, and (2) to a separate AND gate 16. An OR gate is also known as a buffer, and it operates such that its output is "1" when any one or more of its inputs is "1" and its output is "0" when all of its inputs are "0." An AND gate is also known as a coincidence gate, and it operates such that its output is "1" when all of its inputs are simultaneously "1" and its output is "0" when any of its inputs is "0." AND gates and OR gates of a suitable type may be found described and shown in an article by Felker in Electrical Engineering, volume 71, No. 12, December 1952, entitled "Typical block diagrams for a transistor digital computer."

Each one of the OR gate outputs is connected to a principal AND gate 18. This AND gate has its output connected (1) to an inverter circuit 20 and (2) to an input AND gate 24. The output of the inverter circuit 20 is connected to a second input of the plurality of AND gates 16 and also to still another input AND gate 22. The inverter circuit is a well known circuit and may be a vacuum tube which is biased to cut off to provide a more positive output level in the absence of a positive input. This is a vacuum tube which has a negative grid bias applied thereto, thereby cutting off the flow of current through the tube. A positive input enables current to flow, thus driving its output less positive or to the so-called "0" level. Therefore, when the principal AND gate 18 output is at "1," the inverter output is at "0," and when the AND gate 18 output is at "0," the inverter output is at "1."

The first input AND gate 22, which is coupled to the output of the inverter, and the second input AND gate 24, which is coupled to the output of the principal AND gate, both have their outputs connected to a serial shift register 26. These input AND gates also have the clock pulses applied to their second inputs through a timing AND gate 28. This timing AND gate has one input connected to the clock-pulse source 12 and a second input connected to the "1" output of a starting flip-flop circuit 30. The serial shift register 26 is of a well known type, a suitable example of which is described and shown in an article published in Electronics Magazine, pages 181–184, for November 1949, by Stevens and Knapton, and entitled "Gate type shifting register." It consists of a plurality of flip-flops coupled in series by gate circuits so that upon application of a shift pulse to all the gate circuits the condition of each flip-flop circuit is transferred to the flip-flop immediately following it. Thus, digital information may be entered into one end of the register and shifted through it and out the other end. To insert the digit "1" into the register AND gate 24, output must be at "1" and AND gate 22 output must be at "0." To insert the digit "0" into the register, AND gate 24 output must be at "0" and AND gate 22 output must be at "1."

A flip-flop circuit of a suitable type is also found described and shown in High Speed Computing Devices, Chapters 3 and 4, by Engineering Research Associates, Inc., and published by the McGraw-Hill Book Company. The flip-flop, as is known, has two tubes with cross-connected grids and anodes. It has two stable conditions, one with one tube conducting and the other tube cut off, and the second condition with the conduction-nonconduction states of the tubes reversed. If one condition is designated as the reset condition and the other condition as the set condition, then the tube grid to which a more positive pulse ("1" digit) is applied to establish a flip-flop in its reset condition may be designated as a reset input. Accordingly, the other tube grid may be designated as a set input. The tube output that is high (tube is nonconducting) when the flip-flop is in its reset condition is the "0" output, and the tube output that is high when the flip-flop is in its set condition is the "1" output. This describes the usual practice in the electronic computer art.

The output of the starting flip-flop 30, when in its set condition, is also applied as a third input to each one of the plurality of AND gates 16 coupled to the various data sources 10. The clock-pulse source 12 also applies a timing pulse to each of the AND gates 16. The output of each one of these plurality of AND gates is connected to the reset input of a different flip-flop circuit 32. Each of these flip-flop circuits may be of the same type as described above.

The reset input of each of these flip-flops 32 when excited provides a "1" level output which is applied to the OR gate 14 or buffer circuit associated with the particular AND gate 16 which is driving the flip-flop. The output of the serial shift register is also connected to another one of the plurality of AND gates 16', which has, as its other inputs, (1) an output from the inverter, (2) a clock-pulse input, and (3) the output of the starting flip-flop. This particular AND gate 16', like the others, has its output connected to the reset terminal of another flip-flop 32'. This flip-flop reset output is connected to an OR gate 14' which has its output also connected to the principal AND gate 18.

A description of the operation of the sorting system follows. Let it be assumed that there is a binary number stored in the serial register from a previous sort, and it is wished to disregard this number in the sorting process which is to commence. This may be achieved by exciting, during the time required to shift the number to be disregarded from the register, a signal source which may be called a "disregard" source. This source applies a "1" representative signal to the OR gate coupled to the output of the serial shift register. A "1" pulse is applied from a "start" signal source 34 to the set terminal of all the flip-flop circuits in the system. This causes the starting flip-flop circuit 30 to provide a "1" output to the timing AND gate 28 and to the plurality of AND gates 16. Clock pulses are also applied to this timing gate and, therefrom, as shift pulses to the serial shift register 26 and as timing pulses to the two input AND gates 22, 24 connected to the input of the register. Each one of the other flip-flops 32 is set so that the output lead connected therefrom to the respective OR gates is at "0."

Digit representative signals timed by the clock-pulse source are supplied from the plurality of data sources, as previously described, and also from the serial register. If these signals are all representative "1" levels, then the principal AND gate 18 provides a "1" input to the second one of the input AND gates connected to the serial register, and, since this AND gate is receiving a clock pulse, its output, which is a "1" signal, is entered into the register. The first digit from the register which was shifted out by the clock pulse is not considered by the principal AND gate, regardless of whether it is a "1" or a "0." This is achieved by the "1" pulse being applied from a disregard source 36 to the OR gate 14'. As long as the disregard source 36 operates, the signals from the register are disregarded by the principal AND gate.

As the digit signals from the various data sources continue to be supplied and as long as they are all "1's" the principal AND gate will apply a "1" representative signal to the serial register to be entered and stored therein and also to the inverter to maintain it cut off. In this manner, the plurality of AND gates are closed, since a "1" signal to one of their inputs (that from the inverter) is not available. Should one or more of the data sources supply a "0" when the other data sources supply a "1," the principal AND gate would not operate to provide a "1" output to keep the inverter at "0" (cut off), whereupon the inverter would provide a "1" output. This inverter output is applied to the first input AND gate and to all the plurality of AND gates. The input AND gate enters a "0" into the serial register and causes the inverter to present a "1" signal to each of the plurality of AND gates which are associated with the data sources, so that if a data source presents a "1" digit to its associated AND gate, the AND gate output will be a "1," thus applying a pulse to the reset terminal of the associated flip-flop circuit 32. These flip-flop circuits are driven to reset and provide a positive "1" output to the buffer circuit 14 associated therewith, and these flip-flop circuits will stay in the reset condition to which they are driven until they are set again by a signal from the starting signal source 34. Therefore, each one of the reset flip-flops applies a "1" level pulse to the principal AND gate in place of any output or signal which may emanate from the data source associated therewith. This means that the data sources which supply a "1" are cut off for the remainder of the number when one or more of the other data sources supply a "0."

The data sources which remain open will continue to provide signals representative of binary digits which are entered into the serial shift register, and the system will continue to operate, closing the first of the remaining data sources which provides a "1" when the others provide "0's." It should be appreciated that the number finally left in the serial register is the lowest number which was stored in the plurality of data sources.

If it is desired to permit the number in the register at the commencement of the sorting pulses to be compared with the numbers from the data sources, then the disregard source pulse is not excited, and the digits from the serial shift register are then considered along with the data source digits. Should it be desired to employ this invention to sequentially sort information from cyclic sources of data, such as a magnetic drum having many tracks, then the binary coded numbers or words are fed from the data sources. The parallel sorter retains the smallest number in the register. The trigger circuits 32, 32' are all reset by a pulse each time a single binary number or word from each of the data sources has been completed and compared. The next binary number is then fed from each of the data sources, to be compared with each other and with the number stored from the previous data sort in the register. This operation is repeated until one complete cycle has been completed by the drum. The shift register then contains the smallest number on the drum. This number is shifted out and stored, and the drum is rotated through a second cycle so that at each place where the smallest number appears, the number is either erased from this place or some identification of this number is made in order that the smallest number will not again be entered into the sorter. The drum is rotated through another cycle during which the sorter searches for the smallest number in the previously described manner. This is followed by another cycle during which all of the next smallest numbers are marked or erased. Thus by following sorting with marking cycles of the drum, the information on the drum is rapidly sorted into a sequence. In this manner data from a plurality of cyclic data sources can be sorted into sequence. Apparatus is well known for comparing binary numbers for equality. It is used to compare the smallest numbers entered in the register with those in the cyclic data sources for marking or erasing them during the marking cycle, thus preventing their being considered again by the sorter.

To stop the sorting process, the start flip-flop may receive a pulse to be driven to its reset condition, whereby the first AND gate is closed. It should be appreciated that the AND gates and other apparatus may be made responsive to negative-going pulses or the absence of pulses, so that the sorting system which is an embodiment of this invention can provide the largest number from a plurality of data sources, instead of the smallest number. The number of data sources which can be handled by the embodiment of the invention may be made as small or as large as desired. If desired, the sorter may be used for searching purposes. A number may be inserted in the shift register. The apparatus is then started, and, at the end of the operation, the number in the shift register is the same if no number smaller (or larger, if desired) is in the data sources examined.

Accordingly, there has been described hereinabove a novel and useful system and apparatus for sorting data presented from a plurality of sources in serial binary coded manner.

We claim:

1. Apparatus for sorting, from a plurality of data sources, signals representative of binary coded numbers ordered serially comprising a first means coupled to all said sources to provide one output when the signals provided from said sources all are representative of one binary digit and to provide another output when the signals provided from said sources are not all representative of said one binary digit, means responsive to said second output and to said one binary digit from a data source to prevent signals from said data source from being applied to said first means, and means to store the output from said first means as one binary digit for said one output and as another binary digit for said another output.

2. Apparatus for sorting, from a plurality of data sources, signals representative of binary coded numbers ordered serially comprising a first means having its inputs coupled to all of said data sources to provide one output when all of the digits provided simultaneously from said sources are the same and of one type and to provide a second output when all of the digits provided simultaneously are not the same or are of another type, a plurality of means each of which has its input coupled to a different data source and to the output of said first means and its output coupled to said first means to provide an input of one type to said first means in place of the input from the data source to which it is coupled responsive to a digit of one type from the associated data source and a second output from said first means, and means to store as a binary number the output from said first means whereby the smallest or the largest of the numbers provided from said data sources is stored.

3. Apparatus for sorting from a plurality of data sources signals representative of binary coded numbers ordered serially and with the most significant digit first comprising a shift register having an input and an output, a first means having its inputs coupled to all of said data sources and to the output of said register to provide one output when all of the digits provided simultaneously to its inputs are the same and of one type and to provide a second output when all of the digits provided simultaneously are not the same or are of another type, the output of said first means being coupled to the input to said shift register, a plurality of means each of which provides an output of said one type responsive to a substantially identical actuation of all of its inputs, all but one of said plurality of means having one input coupled to a different data source and a second input coupled to the output of said first means, said one of said plurality of means having one input coupled to the output of said shift register and a second input coupled to the output of said first means, the outputs from each of said plurality of means being coupled to the same input to said first means as is the one to which said one of its inputs is coupled, and means to shift a digit out of said shift register as a digit is registered therein whereby the smallest or the largest of the numbers provided from said data sources is entered into said register.

4. Apparatus as recited in claim 3 wherein said first means includes an AND gate and an inverter coupled to said AND gate output.

5. Apparatus for sorting binary coded numbers as recited in claim 3 wherein each of said plurality of means includes an AND gate, and a flip-flop responsive to an output from said AND gate to provide an output of said one type.

6. Apparatus for sorting signals representative of binary coded numbers ordered serially and with the most significant digit first from a plurality of data sources comprising a plurality of OR gates each of which has one of its inputs coupled to a different data source, an AND gate to which the outputs from all said OR gates are coupled, a plurality of AND gates each of which has one input coupled to a different one of said data sources, an inverter coupled to receive output from said AND gate and to apply its output to another input of each of said plurality of AND gates, a plurality of flip-flops each of which has an input coupled to the output of a different one of said plurality of AND gates and an output responsive to said input coupled to another input of the one of said OR gates which is coupled to the associated data source, and a register having its input coupled to the output of said AND gate and said inverter whereby the smallest or the largest of the numbers provided from said data sources is entered into said register.

7. Apparatus for sorting from a plurality of data sources signals representative of binary coded numbers ordered serially and with the most significant digit first comprising a shift register having an output, a plurality of OR gates all but one of which has one of its inputs coupled to a different data source, said one of said OR gates having one of its inputs coupled to the output of said shift register, an AND gate to which all the outputs of said OR gates are coupled, an inverter coupled to receive output from said AND gate, means coupling said shift register to receive output from said AND gate and said inverter, a plurality of AND gates each of which has one input coupled to said one of the inputs of a different one of said OR gates and a second input connected to the output from said inverter, a plurality of flip-flops each of which is coupled to the output of a different one of said plurality of AND gates to provide an output responsive thereto the output from each of said flip-flops being coupled to another input of the OR gate with which its driving AND gate is associated, and means to apply shift pulses to said register to step digits out of said shift register whereby the smallest or the largest binary coded number will be stored in said shift register at the termination of the signals from said data sources.

8. Apparatus as recited in claim 7 wherein said means coupling said shift register to receive output from said AND gate and said inverter comprises a first AND gate having one input coupled to the output of said inverter and another input coupled to said means to apply shift pulses to said register, a second AND gate having one input coupled to the output of said AND gate and another input coupled to said means to apply shift pulses to said register, and the outputs of said first and second AND gates are coupled to the input of said shift register.

9. Apparatus for sorting from a plurality of data sources signals representative of binary coded numbers ordered serially and with the most significant digit first comprising a shift register having an output, a plurality of OR gates all but one of which has one of its inputs coupled to a different data source, said one of said OR gates having one of its inputs coupled to the output of said shift register, a principal AND gate to which all the outputs of said OR gates are coupled, a first and a second register input AND gate having their outputs coupled to the input of said shift register, means to apply shift pulses to said first and second register input AND gates and to said shift register to shift digits into and out of said shift register, an inverter having its input coupled to said principal AND gate output and its output coupled to said first AND gate input, said principal AND gate input being coupled to said second AND gate input, a plurality of AND gates each of which has one input coupled to a different one of said data sources and a second input coupled to the output of said inverter, a plurality of flip-flops each of which has a set and a reset input terminal and a reset output terminal, each of said plurality of AND gates having its output coupled to the reset input terminal of a different one of said flip-flops, each of said flip-flop reset output terminals being coupled to another input of the OR gate having its one input coupled to the AND gate associated with said flip-flop, and means to apply a signal to said one of said OR gates to prevent the digit signals from said shift register from being applied to said principal AND gate.

References Cited in the file of this patent

UNITED STATES PATENTS

| | | |
|---|---|---|
| 2,074,392 | Herbst | Mar. 23, 1937 |
| 2,444,421 | Boston | July 6, 1948 |
| 2,617,704 | Mallina | Nov. 11, 1952 |
| 2,674,733 | Robbins | Apr. 6, 1954 |
| 2,675,538 | Malthaner | Apr. 13, 1954 |